No. 645,381. Patented Mar. 13, 1900.
C. H. BAYLEY.
SLEEVE BEARING.
(Application filed Dec. 5, 1899.)
(No Model.)

Witnesses:
Roy K. Hill.
Annie J. Dailey.

Inventor:
Charles H. Bayley.
by Crossley & Davis.
Attorneys.

UNITED STATES PATENT OFFICE.

CHARLES H. BAYLEY, OF BOSTON, MASSACHUSETTS.

SLEEVE-BEARING.

SPECIFICATION forming part of Letters Patent No. 645,381, dated March 13, 1900.

Application filed December 5, 1899. Serial No. 739,290. (No model.)

*To all whom it may concern:*

Be it known that I, CHARLES H. BAYLEY, of Boston, in the county of Suffolk and State of Massachusetts, have invented certain new and useful Improvements in Leather-Skiving-Machine Sleeve-Bearings, of which the following is a description sufficiently full, clear, and exact to enable those skilled in the art to which it appertains or with which it is most nearly connected to make and use the same.

The object of the present invention is to provide an improved form of sleeve-bearing for rotary shafts which are longitudinally adjustable—as, for example, the knife-shaft in a leather-skiving machine of the type shown in Patent No. 632,984, granted to me September 12, 1899. A sleeve-bearing embodying the present invention is there shown in connection with the knife-shaft, so that it is deemed unnecessary to illustrate more in the present case than the bearing itself, its relation to the parts with which it coöperates being ascertainable by reference to said patent. The bearing is characterized by a construction which permits of its ready removal, together with the shaft, from the machine and replacement therein without in any manner disturbing the adjustment of the parts, so as to require readjustment on account of such removal and replacement.

The essential elements of the invention are recited in the appended claims, and a preferred form of embodiment thereof is specifically described hereinafter and illustrated in the accompanying drawings, whereof—

Figure 5:
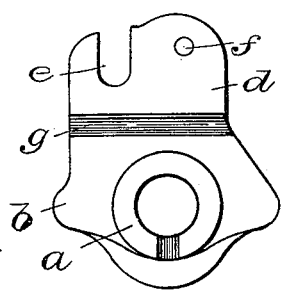
Figure 1:
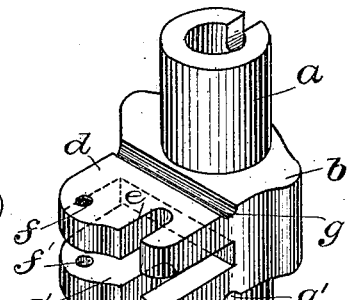
Figure 6:
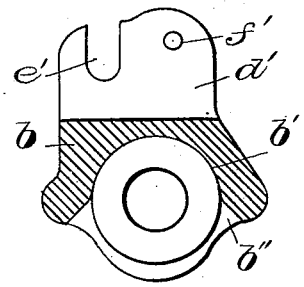
Figure 2:
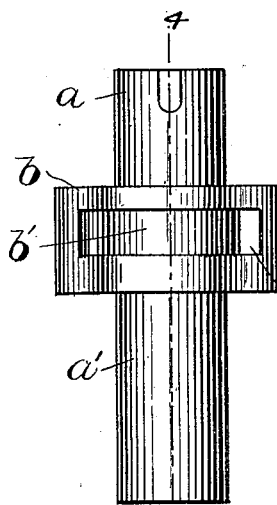
Figure 3:
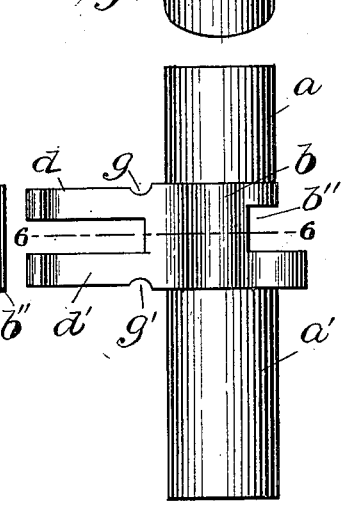
Figure 4:
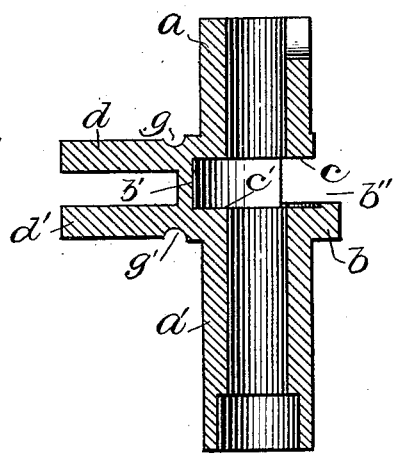

Figure 1 represents the bearing in perspective. Figs. 2 and 3 represent the same in side elevation, the views being taken at right angles to each other. Fig. 4 is a longitudinal section on line 4 4 of Fig. 2. Fig. 5 represents the bearing in end elevation as viewed from the upper side of Fig. 1. Fig. 6 is a cross-section on line 6 6 of Fig. 3.

The reference-letters $a$ and $a'$ designate cylindrical alining end portions of the bearing designed to have a sliding fit in suitable bearings on the machine, and $b$ designates an enlarged open-side intermediate portion of the bearing integral with the said cylindrical end portions and having an interior semicylindrical wall $b'$, concentric with the bores of the latter, but of larger diameter. This intermediate portion may be described as transversely slotted, with the slot flaring from the semicylindrical wall, as shown at $b''$ in Fig. 6, so as to facilitate the introduction of a collar for attachment to the shaft in effecting longitudinal connection between the shaft and bearing, the interior end wall $c'$ of the enlargement $b$ affording an annular shoulder for engagement with the shaft-collar. Opposite the open side of the said enlargement there is a comparatively-wide laterally-projecting portion bifurcated transversely to the axis of the bearing, so as to form a pair of ears $d$ and $d'$ for attaching purposes, said ears being bifurcated in alinement at right angles to the bifurcation which divides them, so as to provide notches $e$ and $e'$ for the accommodation of an adjusting rod or stem having a collar which takes between the ears. In order to obviate lost motion between the latter and the collar, provision is made for contracting the bifurcation between the ears, the latter being formed with alining-holes $f$ and $f'$, one of which is screw-threaded, so that a screw entered through the other hole and engaged with such screw-threads may operate to draw the ears toward each other. To facilitate this operation, some metal of the bearing is removed by grooving across the lines of juncture between the ears and the enlargement $b$, as shown at $g$ and $g'$.

It will be seen that a bearing of the construction described is adapted to be removed from and replaced in a machine—such, for example, as that shown in my patent hereinbefore mentioned—without in the least disturbing the adjustment of parts which determine the position of the bearing and its shaft in the machine. It is also to be noted that ample wearing-surface for a shaft-collar is provided by the wall $c'$ of the intermediate enlargement of the bearing, which provides a shoulder extending entirely around the shaft.

Having thus explained the nature of the invention and described a way of constructing and using the same, though without attempting to set forth all of the forms in which it may be made or all of the modes of its use, it is declared that what is claimed is—

1. As a new article of manufacture a sleeve-bearing for rotary longitudinally-adjustable shafts, the same comprising cylindrical end portions and an open-side intermediate connecting portion of enlarged interior diameter, substantially as and for the purpose described.

2. As a new article of manufacture a sleeve-bearing for rotary longitudinally-adjustable shafts, the same comprising cylindrical end portions and an open-side intermediate connecting portion of enlarged interior diameter, together with a laterally-projecting attaching portion, substantially as and for the purpose described.

3. As a new article of manufacture a sleeve-bearing for rotary longitudinally-adjustable shafts, the same comprising cylindrical end portions and an open-side intermediate connecting portion of enlarged interior diameter, together with a laterally-projecting attaching portion having right-angle bifurcations, substantially as and for the purpose described.

4. As a new article of manufacture a sleeve-bearing for rotary longitudinally-adjustable shafts, the same comprising cylindrical end portions and an enlarged open-side portion having a semicylindrical interior wall of larger diameter than the bores of the cylindrical end portions together with a laterally-projecting attaching portion, substantially as described.

5. As a new article of manufacture, a sleeve-bearing for rotary longitudinally-adjustable shafts, the same comprising a cylindrical portion and an adjoining open-side portion of enlarged interior diameter, together with a laterally-projecting attaching portion.

6. As a new article of manufacture, a sleeve-bearing comprising a cylindrical portion and a laterally-projecting attaching portion with right-angle bifurcations, substantially as and for the purpose described.

7. As a new article of manufacture, a sleeve-bearing comprising a cylindrical portion and a laterally-projecting attaching portion bifurcated transversely of the cylindrical portion, the material of the bearing being reduced in thickness along the lines of juncture of the bifurcated portion with the main portion of the bearing and provision being made for adjusting the bifurcation by springing its members on such reduced junctures.

In testimony whereof I have signed my name to this specification, in the presence of two subscribing witnesses, this 24th day of November, A. D. 1889.

CHARLES H. BAYLEY.

Witnesses:
ARTHUR W. CROSSLEY,
F. P. DAVIS.